(12) United States Patent
Goehlich et al.

(10) Patent No.: US 10,661,434 B2
(45) Date of Patent: May 26, 2020

(54) SUPPORT DEVICE FOR STABILIZING A BODY PART OF A PERSON

(71) Applicant: Airbus Operations GmBH, Hamburg (DE)

(72) Inventors: Robert Alexander Goehlich, Hamburg (DE); Sven Chromik, Hamburg (DE); Robert Weidner, Bohlsen (DE); Zhejun Yao, Hamburg (DE); Jens Wulfsberg, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 15/006,800

(22) Filed: Jan. 26, 2016

(65) Prior Publication Data

US 2016/0221181 A1 Aug. 4, 2016

(30) Foreign Application Priority Data

Jan. 29, 2015 (DE) .................... 10 2015 101 329

(51) Int. Cl.
| | |
|---|---|
| *B25J 9/00* | (2006.01) |
| *B25H 1/00* | (2006.01) |
| *A41D 13/00* | (2006.01) |
| *A41D 13/05* | (2006.01) |
| *A41D 31/00* | (2019.01) |

(52) U.S. Cl.
CPC ........ *B25J 9/0006* (2013.01); *A41D 13/0005* (2013.01); *A41D 13/05* (2013.01); *A41D 31/0005* (2013.01); *B25H 1/0028* (2013.01); *A41D 2600/20* (2013.01)

(58) Field of Classification Search
CPC .... B25J 9/0006; A41D 13/0005; A41D 13/05; A41D 31/0005; A41D 2600/20; B25H 1/0028; A61H 1/00; A61H 2201/00; A61H 2201/1664
USPC ............ 2/463, 16, 461, 464, 910; 414/1, 10; 901/30, 41
See application file for complete search history.

(56) References Cited

U.S. PATENT DOCUMENTS

| | | | | |
|---|---|---|---|---|
| 3,405,406 A | * | 10/1968 | Vykukal | |
| 3,535,711 A | * | 10/1970 | Fick | ..................... A61F 5/0102 294/907 |
| 3,631,542 A | * | 1/1972 | Potter | ...................... A61F 2/72 601/40 |

(Continued)

FOREIGN PATENT DOCUMENTS

| | | | |
|---|---|---|---|
| CA | 2450006 A1 | * | 6/2005 |
| CN | 203549333 U | | 4/2014 |

(Continued)

*Primary Examiner* — Kimberly T Wood
(74) *Attorney, Agent, or Firm* — Lerner, David, Littenberg, Krumholz & Mentlik, LLP

(57) ABSTRACT

A support device, in particular an assembly support device for stabilizing a body part of a person includes a plurality of hinged-together elements designed to at least partially envelop a body part of a person, so that the plurality of hinged-together elements collectively form a flexible shell for the body part of the person. The flexible shell is designed to transfer a portion of a load acting on the body part of the person in order to stabilize the body part of the person. A vehicle, to which is secured an assembly support device, as well as a method for stabilizing a body part of a person during the assembly of a vehicle are also described.

13 Claims, 5 Drawing Sheets

(56) References Cited

U.S. PATENT DOCUMENTS

| | | | |
|---|---|---|---|
| 5,007,108 A | 4/1991 | Laberge et al. | |
| RE43,395 E | 5/2012 | Budda | |
| 8,266,778 B2 | 9/2012 | Neuhaus et al. | |
| 8,968,222 B2* | 3/2015 | Kazerooni | B25J 9/0006 |
| | | | 224/265 |
| 9,610,693 B2* | 4/2017 | Sarh | B21J 15/142 |
| 10,085,908 B2* | 10/2018 | Lee | A61H 1/0237 |
| 2006/0161220 A1* | 7/2006 | Kobayashi | A61F 5/0102 |
| | | | 607/49 |
| 2008/0167591 A1 | 7/2008 | Yahya | |
| 2009/0248202 A1* | 10/2009 | Osuka | A61B 1/0055 |
| | | | 700/245 |
| 2011/0266323 A1* | 11/2011 | Kazerooni | B25J 9/0006 |
| | | | 224/575 |
| 2012/0223551 A1* | 9/2012 | Amante | B64D 11/06 |
| | | | 297/216.1 |
| 2013/0090580 A1* | 4/2013 | Hong | A61H 1/0277 |
| | | | 601/33 |
| 2014/0145128 A1 | 5/2014 | Durand et al. | |
| 2014/0296761 A1 | 10/2014 | Yamamoto et al. | |
| 2017/0027803 A1* | 2/2017 | Agrawal | A61B 5/6828 |
| 2017/0072555 A1* | 3/2017 | Krohne | B25H 1/0028 |

FOREIGN PATENT DOCUMENTS

| | | |
|---|---|---|
| CN | 104053424 A | 9/2014 |
| JP | 2007-167484 A | 7/2007 |
| JP | 2012-61262 A | 3/2012 |

* cited by examiner

SUPPORT DEVICE FOR STABILIZING A BODY PART OF A PERSON

FIELD OF INVENTION

The present invention relates to the assembly of vehicle components. In particular, the invention relates to a support device for stabilizing a body part of a person, as well as to a vehicle to which a support device is secured. The invention further relates to a method for stabilizing a body part of a person during the assembly of a vehicle.

BACKGROUND OF THE INVENTION

During the assembly of vehicles, in particular of aircraft or spacecraft, working personnel perform a plurality of work steps inside and outside the fuselage, wing and other large components. For example, riveted or screwed connections are here made, and electrical or hydraulic supply lines are installed. In some circumstances, it could happen that the respective working personnel must perform various work steps in difficulty accessible areas of the fuselage, wing and other large components. In addition, various tools and parts or components are needed when performing the various work steps. In the process of assembling the fuselage, wing and other large components, these tools and parts or components are always again brought into the desired position, so as to attach the respective component to the location provided for that purpose.

Different concepts are used in the area of fuselage assembly. For example, U.S. Pat. No. 8,266,778 B2 describes an assembly device for supporting a fuselage section of an aircraft or spacecraft in an adjustable assembly position with at least one stiffening bracket for detachably stiffening the fuselage section and a pivot mount that rotatably mounts the at least one stiffening bracket.

US 2014/0145128 A1 describes a method for installing a cable harness in an airplane. The method utilizes cables whose first ends are attached to the cable harness, along with winding devices. The cables are wound onto the winding devices, so that the cable harness can be lifted by applying a tensile force to the cables.

BRIEF SUMMARY OF THE INVENTION

One aspect of the invention indicates a support device for stabilizing a body part of a person and/or a posture of a person. In particular, the support device is an assembly support device for stabilizing a body part of a person and/or a posture of a person. The support device or assembly support device comprises a plurality of elements hinged to each other, which are designed to at least partially envelop a body part of a person, so that the plurality of hinged-together elements together form a flexible shell for the body part of the person. The flexible shell is here designed to transfer a portion of the load acting on the body part of the person in order to stabilize the body part of the person. For example, the load is here transferred to a second body part of the person.

In the following description, the assembly support device is primarily described based on the example of an airplane fuselage, wherein the assembly support device may also be generally used for aircraft or spacecraft, or for similar tasks in other branches, such as the automotive and construction industries. For example, the aircraft may be an airplane, a helicopter or a drone. The spacecraft may here be a space shuttle, a launch vehicle, a booster of a launch vehicle, a satellite, a space station module or the like, for example.

The assembly support device according to an embodiment of the invention makes it possible to support a person during the assembly of a vehicle, in particular an aircraft or spacecraft. The person is here supported while lifting heavy components or tools, for example, so that the person has to exert less force to move the corresponding component or tool into a desired position or hold them in a specific position. In other words, the muscular force that the person must exert in order to position the tool or the component to be mounted may be at least partially reduced. The assembly support device thus supports the movement of a body part of a person, ultimately allowing the assembly process to be made more efficient in design. In particular, ergonomic factors, such as physical load or body posture, may be designed more advantageously with the assembly support device. For example, the body posture of the person may be effectively stabilized and supported during overhead operations or when in a kneeling or squatting position. This also leads to a reduction in assembly time, as well as to an increased quality of assembly, since the person mounting the respective component to the vehicle must concentrate less on lifting or positioning the tool or component, and may focus more on an exact and precise alignment of the component to be mounted. The assembly support device serves to transfer or introduce a force, for example a weight force, from body parts of the person with less musculature to body parts with more musculature. In a case where the flexible shell is designed to envelop an arm of the person, the force may be transferred in such a way that the forearm of the person is more strongly supported by the flexible shell than the upper arm. In addition, this also makes it possible to support the movements of physically disadvantaged persons. In particular, given a fracture in the corresponding body part of the person, the body part of the person may be effectively stabilized. As a consequence, the device according to an embodiment of the invention is suitable not just for assembly, but may also be used in the area of sports, catastrophies or medicine. In general, the device may be used in areas with limited transport capabilities, such as space stations, since the adaptability to the physical circumstances of the respective person requires that only one device be used to realize a wide variety of stabilizing characteristics. For example, the support device according to an embodiment of the invention may also be used in space travel, in particular as a means for slowing bone and muscle loss in those persons whose body part is enveloped by the support device. Forces may here be specifically introduced into various areas of the body, so as to make training more effective in design or shorten the recommended training time with the same effect.

As a result, the support device may be configured and designed for use in space travel as a medical or sports support device. In particular, the support device may be used for orthopedic purposes.

In order to make this possible, the body part of the person is at least partially enveloped by a flexible shell. This flexible shell is comprised of several interconnected elements, wherein the elements may overlap and/or intermesh, for example. The body part of the person is an arm, a leg, a torso or upper body, for example, but also a neck of the person. However, the body part is preferably an arm of the person, which is at least partially enveloped by the plurality of hinged-together elements, so that the interconnected elements yield a flexible shell for the arm. For example, the individual elements annularly envelop the body part of the person. The individual elements may further envelop the body part of the person like a ring segment, for example when the individual elements only partially, i.e., incompletely, envelop the body part. For example, the individual interconnected elements comprise a pot-shaped cross section. In other words, the elements comprise the shape of a hollowed out truncated cone or a comparable shape, wherein the shell surface of the truncated cone forms the part of the element that envelops the body part of the person. For example, the arm of the person is passed through the two front faces of the truncated cone, since the latter is hollowed out. A plurality of hinged-together elements are here interconnected at the respective ends of the truncated cone or pot, or are coupled together at these ends. To this end, connecting elements may be provided for joining or coupling the individual elements. Let it be noted that the number, type and shape of used elements and/or connections between the elements may depend on the respective person and the task to be performed by the person. The individual interconnected elements may comprise varying lengths or diameters. When reference is made below to a length of the element, it is intended to mean the height of the respective truncated cone or pot, while a diameter refers to the respective shell surface of the truncated cone or pot of the individual interconnected elements. However, let it be noted that other shapes may be provided for the elements. For example, rectangular or square, spherical or even cylindrical cross sections may be used for the elements. This will be explained in even more detail in the description to the figures.

The plurality of hinged-together elements forms a flexible shell, which serves to stabilize the body part of the person. For example, the elements enveloping the arm may be brought to a specific position by moving the body part of the person. Subsequent latching makes it possible to fix the individual interconnected elements or flexible shell as a whole in a specific alignment or shape, so that the person only has to exert a reduced force, or none at all, to keep the body part in this position or alignment. As a consequence, the flexible shell is designed to introduce a load acting on the body part to another body part of the person. For example, if a force is acting on the arm of a person by virtue of the person holding a specific weight in his or her hand, the flexible shell may at least partially introduce the force of the weight into the upper body or torso of the person.

The individual elements may here comprise various materials. For example, the plurality of hinged-together elements comprises a metal material, a plastic or a rubbery material. In addition, the connecting elements and/or the elements themselves may integrate fluidic substances, for example so that specific damping characteristics may be set. In particular, the hinged-together elements can be made out of a composite material or light metal, in order to reduce the weight force to be borne by the person. However, the elements could also be made out of a steel and/or rubber. In any event, the elements are designed or fabricated in such a way that the load acting on the body part of the person may be transferred by the plurality of hinged-together elements or the flexible shell. As a consequence, the individual elements of the flexible shell may be rigid.

The structure comprised of several hinged-together elements advantageously makes the flexible shell a modular system, which may be adjusted in terms of its length by adding or subtracting one or more elements. In other words, the flexible shell may be adjusted in an individual and ad-hoc manner to the requirements or physical circumstances of the respective person or to the task to be performed. However, the flexible shell may also comprise elements differing in length, so that the individual elements in the area of one joint in the body part of the person are shorter than in areas where the body part of the person has no joint. As a consequence, an elevated flexibility may be achieved in the area of the joints of the body part, so that the assembly support device does not restrict the movement of the body part of the person. In cases where the flexible shell is designed for enveloping an arm of the person, longer elements may be provided in the area of the upper arm or forearm of the person, for example, while shorter elements may be provided it the area of the elbow. Similarly, the elements may comprise flexible or soft materials in the area of the elbow of the person, wherein harder or stiffer materials may be provided in the area of the upper arm or forearm of the person, thereby enabling an improved force transfer.

Let it be noted that the length of the elements refers to the height of the truncated cone or pot.

In an embodiment of the invention, at least two of the hinged-together elements may be latched to each other in a specific alignment.

This makes it possible to stabilize the body part of the person in a specific position or alignment. For example, as many of the plurality of hinged-together elements as desired are fixed or set in a specific alignment relative to each other for this purpose, so as to thereby support the stabilization of the body part during a specific assembly step. Latching may here be done manually by the person himself or herself, for example when the person brings an element in the area of a first end of the shell into a specific position by rotating it relative to the other elements, so that the flexible shell may be fixed in this alignment, thereby locking the individual elements in the specific alignment relative to each other. In cases where the flexible shell at least partially envelops an arm, the arm itself may be stabilized when the person lifts up an object. For example, this happens when the person brings the object to a specific position, and then latches the individual hinged-together elements with each other, so that the person only has to apply a portion of the weight force of the object in order to hold the latter in the specific position. For example, latching may also take place via manual control, eye movement (pupillography), brain wave measurement (EMG), voice control, gestures (e.g., via a Kinect system) or comparable processes/methods/sensors. Voice control may be used to activate actuators connected with the flexible shell, so that the actuators act on the flexible shell, i.e., on the individual interconnected elements, so as to latch the latter individual interconnected elements. However, the individual elements are preferably latched with each other via mechanical latching, e.g., using a latching mechanism. Various types of revolving mechanisms, screwing mechanisms, or plugging mechanisms may further be used. Let it be noted that each of the elements of the flexible shell may be individually locked in relation to an adjacent element. However, several elements may also be latched together at the same time. As a consequence, three different latching states of the elements of the flexible shell may be set. In a first state, all elements are fixed relative to each other. In a second state, all elements may move freely relative to each other, and in a third state, a portion of the elements are fixed relative to each other, and another portion of the elements may move freely relative to each other.

In another embodiment of the invention, the at least two hinged-together elements are latched by rotating the element.

For example, one of the elements may here be made to latch into an adjacent element by rotating around the at least partially enveloped body part, so that this element and the adjacent element are fixed in a specific alignment relative to each other. This may also be done with other of the plurality of hinged-together elements in the same or similar fashion. It is possible for the rotational movement to become larger as the number of elements latched in their alignment relative to each other increases. In other words, the farther the person rotates an individual element, e.g., one located at the first end of the flexible shell, the more elements may be fixed in their alignment relative to each other. It is likewise possible for a rotational movement of an element in a first direction to lock the alignment of the individual elements relative to each other, so that the flexible shell is quasi-rigid, and rotating the same element in a second, opposite direction releases the lock, so that the person may move the flexible shell as desired.

In another embodiment of the invention, the flexible shell is designed to transfer a load caused by a tool.

The flexible shell is formed by the plurality of hinged-together elements. As a result, a load, for example a weight force of the tool, may be transferred by the plurality of hinged-together elements if the latter were latched in a specific alignment relative to each other. The flexible shell thus serves to transfer a weight force of the tool, for example, so that the person operating the tool may execute the assembly work performed with the tool more efficiently. As a result, the person may concentrate on a precise positioning of the tool, since a majority of the weight force of the tool is introduced into the upper body of the person via the flexible shell, for example. For example, such a tool is a riveting tool or a riveting crimper, a drilling tool or a screwdriver.

In another embodiment of the invention, a fastening element for detachably securing a tool and/or a part or component to the assembly support device is provided in the area of a first end of the flexible shell. The fastening element may comprise a port for holding various tools.

For example, the first end of the flexible shell is located in the area of a hand of the person, wherein a second end of the flexible shell is located in the area of an upper body of the person when the flexible shell envelops an arm of the person. Therefore, the fastening element is secured to the flexible shell in the area of the hand of the person, so that the person may efficiently operate the tool, for example by way of a control element, wherein at least part of the weight force of the tool or part or component may be introduced into the upper body or torso of the person via the fastening element and flexible shell. It is possible for the person to directly activate the tool or hold it in their hand. However, it is also possible for the person to control the movement of the tool using a control element, such as a joystick, voice control, pupillography or comparable processes or methods. Furthermore, the fastening element may be used to achieve a latching of the tool relative to the flexible shell once the tool has been brought to the desired position.

In another embodiment of the invention, the fastening element for detachably securing the tool and/or part or component to the support device comprises a ball joint, which is designed to align the tool relative to the plurality of hinged-together elements.

In particular, the fastening element for detachably securing the tool and/or part or component to the assembly support device comprises a ball joint, which is designed to align the tool relative to the plurality of hinged-together elements. For example, this makes it possible to perform a rotational movement of the tool and/or part in the area of the first end of the flexible shell, so that the tool and/or part may be brought into a desired alignment or position relative to the flexible shell, making it possible to secure the component to be mounted to the corresponding location, for example inside of a vehicle fuselage, in particular an aircraft or spacecraft fuselage. It is also possible for the fastening element to allow a translational movement to be performed between the tool and flexible shell in the area of the first end of the flexible shell. This translational movement may be executed in addition to a rotational movement. The rotational movement or translational movement of the tool relative to the flexible shell may be controlled by the person operating the assembly support device, for example. In other words, the person does not have to hold the tool or part directly in the hand, but may rather control the latter with a control element provided in the flexible shell. This controller may also incorporate specific trajectories that might become necessary, such as a trajectory for threading the part or tool. For example, the control element is here located in the area of the first end of the flexible shell, and may thus be readily gripped by the person. The rotational and/or translational movement of the tool relative to the flexible shell may optionally be prevented by a latching mechanism operable by the person.

In another embodiment of the invention, the flexible shell comprises a fastening unit for securing the support device or assembly support device to a vehicle component.

In particular, the flexible shell comprises a fastening unit for securing the assembly support device to an aircraft component or to a spacecraft component. Such a fastening device may in turn consist of several individual fastening components. For example, the fastening unit encompasses a plurality of ropes, with which the assembly support device is secured to the aircraft fuselage or to the spacecraft fuselage. However, the fastening unit may also comprise rigid fastening components, with which the assembly support device is fastened to the aircraft fuselage or spacecraft fuselage. For example, such rigid fastening components are rod-shaped components or tubular components made out of a metal material, a plastic or a fiber composite.

In another embodiment, the support device comprises a pre-tensioning unit, which is designed to pre-tension the hinged-together elements in a specific alignment relative to each other, so that the flexible shell assumes a specific shape while in an initial state.

In particular, the assembly support device comprises a pre-tensioning unit, which is designed to pre-tension the hinged-together elements in a specific alignment, so that the flexible shell assumes a specific shape while in an initial state. For example, the pre-tensioning unit may be formed by flexible or rigid element-spanning tensioning elements. These pre-tensioning elements of the pre-tensioning unit cause two or more hinged-together elements to be aligned in such a way, for example, that these two or more hinged-together elements must remain in a specific alignment relative to each other, or a force must be applied so as to dissolve this alignment of elements relative to each other. As a consequence, the flexible shell may be pre-tensioned in such a way as to assume a curved shape or straight shape while in an initial state. If the pre-tensioning results in a curved shape for the flexible shell in the initial state, the flexible shell may support a person while moving the body part in such a way that he or she must exert less force when lifting an object in order to bring the flexible shell into the initial state, even if exposed to any weight force of the object. In other words, the flexible shell may always assume the defined shape in the initial state if the person does not exert a force in order to bring the flexible shell into a shape different from the defined shape. Accordingly, the person must exert less force when lifting an object for the shell to assume the defined shape in the initial state.

In another embodiment of the invention, the plurality of hinged-together elements is designed to at least partially envelop an arm of a person, so that the plurality of hinged-together elements together form a flexible shell for the arm of the person, and thereby transfer a load acting on the arm of the person into a torso of the person.

For example, such an embodiment may also provide a shell for the torso of the person, e.g., in the form of a support structure, which uniformly introduces the load transferred by the flexible shell into the torso of the person. The support structure here also at least partially envelops the torso of the person. However, the support structure may also completely envelop the torso of the person, just like the flexible shell does the body part of the person. The support structure may be envisaged as a kind of corset with stiffening elements for transferring or introducing force into the torso of the person. The support structure may also be flexible and/or cushioned in design, so as to adjust to the shape of the upper body or torso of the person. This enables a user-specific adjustment of the shape of the assembly support device, in particular of the flexible shell and/or support structure. The flexible shell may also be latched relative to the support structure by mechanical or magnetic latching mechanisms. The same principle may also be applied to other body parts of the person. For example, the flexible shell may be designed to partially envelop a leg of the person, so that the flexible shell supports specific movements of the leg of the person. The flexible shell may here assume a curved shape in the initial state, for example, which stabilizes the leg of the person, e.g., in a kneeling or squatting position. In particular, this makes it possible to more efficiently design the assembly process, since the person or various body parts of the person, in particular limbs, may be stabilized in different body positions.

In another embodiment of the invention, the support device or assembly support device further comprises a support structure attached to the flexible shell of the arm, which is designed to at least partially envelop the torso of the person, and thereby transfer the load acting on the arm of the person into the torso of the person via the flexible shell and/or support structure.

For example, this support structure consists of a rigid material, or also of a flexible material, so that the support structure may be adjusted to the torso of the person, as a result of which the load acting on the arm or transferred by the flexible shell may be introduced or transferred into the torso of the person via the support structure. The support structure and/or elements of the flexible shell may also comprise a combination of a flexible or rigid material.

In another embodiment of the invention, at least two of the hinged-together elements mutually overlap. For example, the pot-shaped or truncated cone-shaped elements are at least partially inserted into each other. Those ends of the pot-shaped or truncated cone-shaped elements with a smaller diameter are here inserted into those ends of the pot-shaped or truncated cone-shaped elements with a larger diameter, for example. This will be explained in even greater detail in the following description to the figures.

In another embodiment of the invention, at least two of the hinged-together elements mutually mesh into each other.

In other words, the hinged-together elements, for example which are pot-shaped or designed like a hollowed out truncated cone, may be hooked into each other and/or screwed together.

In another embodiment of the invention, the individual hinged-together elements are joined together by mechanical and/or magnetic connecting units.

For example, mechanical connecting units may be screwed joints, hinged joints or connections made out of a flexible material. The mechanical connecting units couple the individual elements to each other, so that the latter are detachably coupled with each other, and may be adjusted to the respective needs or physical circumstances of the person. The assembly support device may thus comprise a modular structure. Magnetic connecting units may likewise be used, so that the individual hinged-together elements are held together by magnets. However, a mixed configuration of magnetic and mechanical connecting units or connecting elements is also possible. As a consequence, a modular system may be provided in which the flexible shell may be adjusted depending on the work steps to be performed or the physical circumstances of the person. Another embodiment of the connecting elements may also contain fluidic substances, so that damping and stiffness properties may be specifically set. Also possible here are substances with which the property, in particular the viscosity, may be altered, for example by changing the current or voltage.

In another embodiment of the invention, the support device, in particular the assembly support device, further comprises a control unit, which is designed to align the plurality of hinged-together elements and/or latch at least two of the hinged-together elements in a specific alignment relative to each other.

For example, the control unit may comprise actuators, which may bring the individual interconnected elements into the defined alignment relative to each other, but also support a movement of the body part of the person. These actuators may be operated by a control unit, eye movement (pupillography), brain wave measurement (EMG), voice control, gestures (e.g., via a Kinect system), or comparable processes/methods/sensors. This also allows the flexible shell to independently move like a robot arm, or reproduce the movement of the body part of the person, and thereby support or stabilize the movement of the person, in particular when a load is acting on a body part of the person. In addition, the actuators may also cause the individual interconnected elements to become latched in a specific alignment relative to each other.

An aspect of the invention indicates a vehicle, to which a support device, in particular an assembly support device according to the above description, is secured.

In particular, the vehicle is an aircraft or a spacecraft. For example, the support device or assembly support device may be attached to an aircraft fuselage or airplane fuselage or a spacecraft fuselage, making it possible to support persons during the assembly of the aircraft fuselage or spacecraft fuselage in the various work steps inside the fuselage.

Another aspect of the invention indicates a method for stabilizing and referencing a body part of a person or a posture of the person during the assembly of a vehicle. In one step of the method, a body part of a person is enveloped by a plurality of hinged-together elements. In another step, a flexible shell of the body part of the person is formed by the plurality of hinged-together elements. In another step of the method, a portion of the load acting on the body part of the person is further transferred by the flexible shell in order to stabilize the body part of the person.

BRIEF DESCRIPTION OF THE DRAWINGS

Exemplary embodiments will be described below, drawing reference to the following figures.

DETAILED DESCRIPTION

The illustrations on the figures are schematic and not to scale.

If the same reference numbers are used in various figures in the following description to the figures, these denote identical or similar elements. However, identical or similar elements may also be labeled with different reference numbers.

Figure 1:
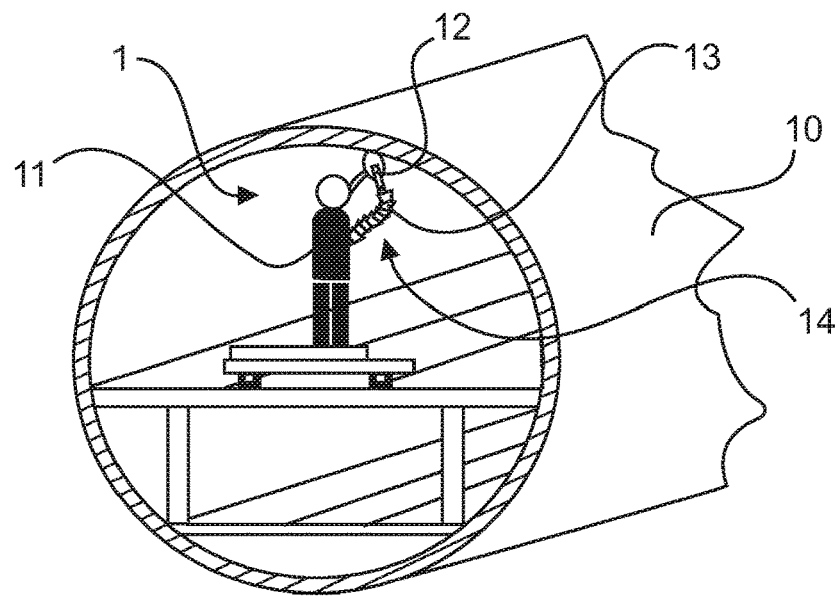
FIG. 1 shows an assembly support device for stabilizing a body part of a person according to an exemplary embodiment of the invention.

FIG. 1 shows an assembly support device 1, which stabilizes a body part of a person 11 or posture during the assembly of an aircraft fuselage 10, in particular an airplane fuselage. The assembly support device 1 comprises a multiplicity or plurality of hinged-together elements 13, which together form a flexible shell 14 for the body part of the person 11. In order to stabilize the body part of the person 11, the flexible shell 14 is here designed to introduce or transfer a load acting on the body part of the person 11, for example into the upper body of the person 11. For example, this load is a weight force of a tool 12 or a component to be mounted on the airplane fuselage 10. The individual elements 13 of the flexible shell 14 here at least partially envelop the body part of the person 11. In the example shown on FIG. 1, one arm of the person 11 is enveloped by the individual hinged-together elements 13, so that these elements 13 together form the flexible shell 14 of the arm of the person 11.

Figure 2:
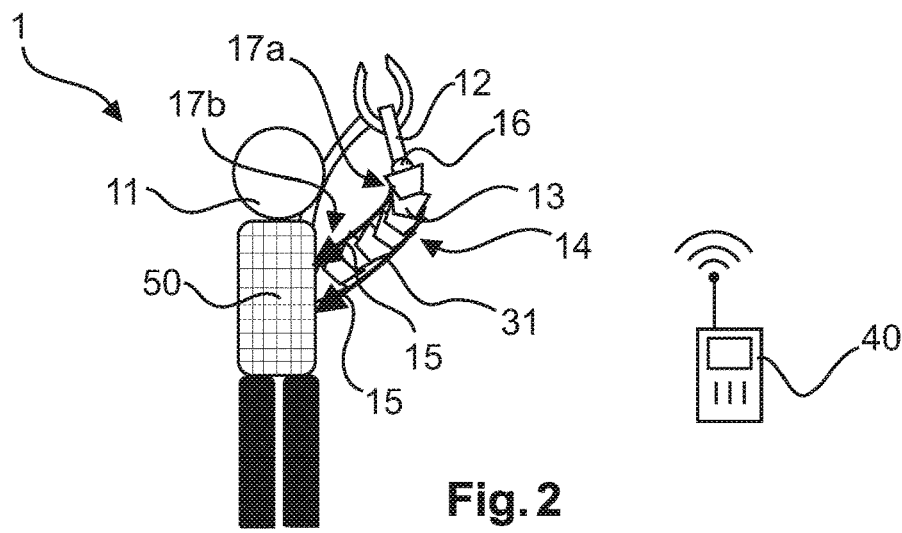
FIG. 2 shows the transfer of a load by the assembly support device into the upper body of a person according to an exemplary embodiment of the invention.

FIG. 2 shows the transfer of a load acting on the arm of the person 11. The load transfer is here denoted by the arrows 15. For example, the load to be transferred or acting on the arm of the person 11 is a weight force of the tool 12. However, it is also possible that the load acting on the arm of the person 11 represents a load triggered by actuating the tool 12. In addition, a fastening element 16 is provided for securing the tool 12 to the flexible shell 14. For example, the fastening element 16 may here be designed to enable a translational or rotational movement of the tool 12. The fastening element 16 is secured in the area of a first end 17a of the flexible shell 14, for example. For example, this first end 17a is located in the area of a hand of the person 11. The fastening element 16 may be secured to an element 13 of the flexible shell 14 in the area of the first end 17a. In the area of a second end 17b of the flexible shell 14, for example, an element 13 is fastened to a support structure 50 that envelops the torso of the person 11, so that the load acting on the arm of the person 11 or the load transferred by the flexible shell 14 may be uniformly introduced into the torso of the person 11. In addition, a control unit 40 with a manually operable interface and/or a voice controller of the assembly support device 1 may be provided, so that the arm of the person 11 may be stabilized or moved by way of manual inputs or voice inputs. For example, the control unit 40 may here be designed as a mobile terminal or secured to the flexible shell 14. The control unit 40 makes it possible to control the alignment of the individual hinged-together elements 13 relative to each other. For example, such a control unit 40 may comprise one or more activatable actuators, wherein the actuators are secured to the flexible shell 14, for example. In this way, the shape of the flexible shell 14, i.e., the alignment of the individual hinged-together elements 13, may be adjusted or set.

Figures 3A, 3B, 3C, 3D:
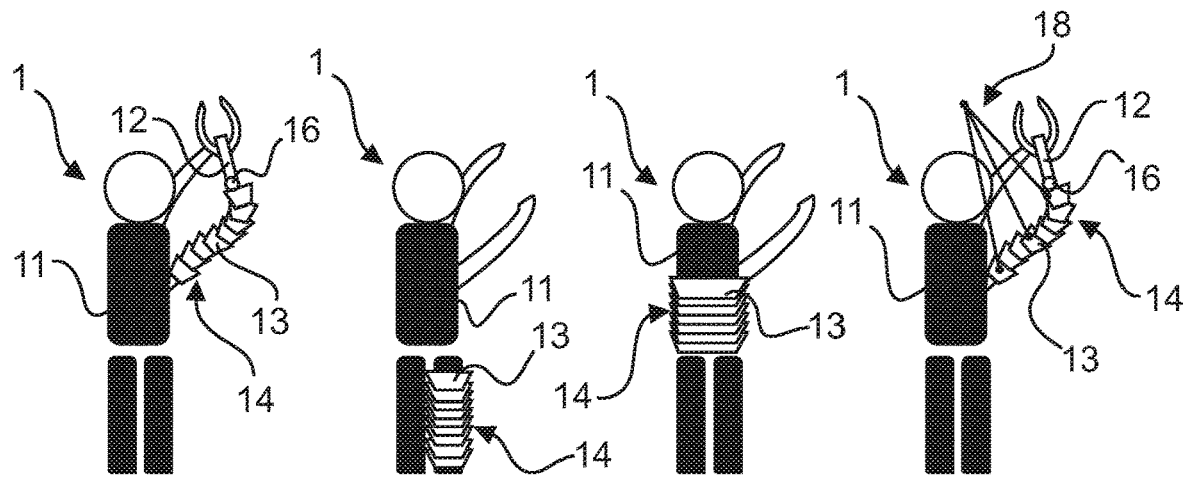
FIG. 3A shows an assembly support device for stabilizing an arm of a person according to an exemplary embodiment of the invention.
FIG. 3B shows an assembly support device for stabilizing a leg of a person according to an exemplary embodiment of the invention.
FIG. 3C shows an assembly support device for stabilizing a torso of a person according to an exemplary embodiment of the invention.
FIG. 3D shows an assembly support device for stabilizing an arm of a person along with a fastening unit for securing the assembly support device according to an exemplary embodiment of the invention.

FIG. 3A shows an assembly support device 1 for stabilizing an arm of a person 11, wherein a plurality of hinged-together elements 13, which collectively form a flexible shell 14, envelop the arm of the person 11. The fastening element 16 is used to secure a tool 12, for example a riveting tool or screwdriver, to the flexible shell 14.

FIG. 3B shows an assembly support device 1, wherein a plurality of hinged-together elements 13 at least partially envelop a leg of the person 11. In particular, the individual hinged-together elements 13 collectively form a flexible shell 14, which also at least partially envelops the body part of the person 11. As a result, the leg of the person 11 may be stabilized, which enables an elevated comfort, in particular while in a squatting position.

FIG. 3C shows an assembly support device, which comprises a plurality of hinged-together elements 13. The plurality of hinged-together elements 13 here forms a flexible shell 14, which in turn at least partially envelops the torso of the person 11. In this way, the torso or upper body of the person 11 may be stabilized.

FIG. 3D shows an assembly support device with a plurality of hinged-together elements 13, which collectively form a flexible shell 14, wherein the flexible shell 14 is secured to a vehicle fuselage component not depicted on FIG. 3D by a fastening unit 18. In the configuration shown on FIG. 3, for example, the fastening unit 18 comprises three rope-shaped or rod-shaped elements. For example, the individual ropes or rods for securing the flexible shell 14 to the vehicle fuselage component are connected or fastened to the flexible shell 14 at junctions between the individual elements 13.

Figure 4A:
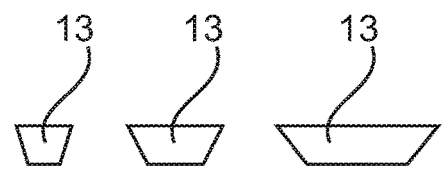
FIG. 4A shows cross sectional shapes of an element of an assembly support device according to an exemplary embodiment of the invention.

FIG. 4A shows possible cross sectional shapes of an element of an assembly support device 1. In particular, FIG. 4A shows three different cross sections of elements 13 of an assembly support device 1. The elements depicted on FIG. 4A have a trapezoidal or pot-shaped cross section. The elements 13 are rotationally symmetrical bodies, and thus in particular form a hollowed-out truncated cone or pot, through which a body part of a person may be pushed. In particular, the elements 13 may be stacked onto the body part of the person individually or in the form of several hinged-together elements 13. Let it here be noted that several hinged-together elements 13 collectively form a flexible shell 14.

Figure 4B:
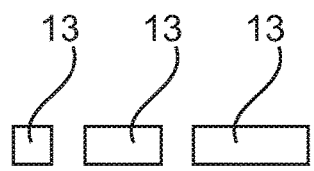
FIG. 4B shows cross sectional shapes of an element of an assembly support device according to another exemplary embodiment of the invention.

FIG. 4B shows another example for possible cross sectional shapes of an element 13 of an assembly support device 1. In particular, three different cross sections of elements 13 are shown. These elements may have a square or rectangular cross section. For example, the elements 13 are rotationally symmetrical bodies, so that the elements 13 depicted on FIG. 4B may be cylindrical components given their respective rotational symmetry. The cylindrical shell surfaces of the elements 13 here each envelop the body part of the person 11.

Figure 4C:
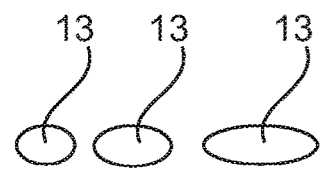
FIG. 4C shows cross sectional shapes of an element of an assembly support device according to another exemplary embodiment of the invention.

FIG. 4C shows another example for possible cross sectional shapes of elements 13 of an assembly support device 1. The elements 13 here comprise a circular or elliptical cross section. A combination of various shapes for the individual elements 13 within a flexible shell 14 is also possible.

Let it be noted that FIG. 4A to 4C depict rotating bodies, wherein the rotational axis of the rotating bodies lies in the image plane of the figures.

Figure 5A:
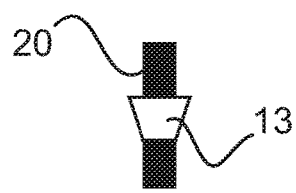
FIG. 5A shows an element of an assembly support device, which at least partially envelops a body part of a person, according to an exemplary embodiment of the invention.

FIG. 5A shows how an element 13 envelops a body part 20, in particular an arm of a person 11. In order to form a flexible shell 14, a plurality of hinged-together elements 13 are arranged one after the other on the arm of the person 11, for example as depicted on FIGS. 1 to 3A.

Figure 5B:
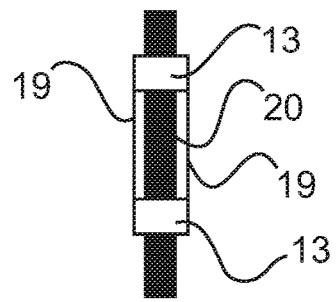
FIG. 5B shows two interconnected elements according to an exemplary embodiment of the invention.

FIG. 5B shows two elements 13 of an assembly support device 1, which are arranged one after the other and joined together by connecting units 19. Both elements 13 envelop the body part 20 of a person 11. The two elements 13 may be joined together by the connecting units 19 in such a way that the elements 13 may move relative to each other. For example, the connecting units 19 may be rod-shaped components or struts. In addition, the connecting units 19 may be designed to fix the two elements 13 depicted on FIG. 5B in a specific alignment relative to each other. This ensures that the body part 20 of the person 11 may be supported or stabilized. The individual elements may be coupled together by one or two connecting elements 19, or a network thereof. Given connecting units 19 in the form of a network, it is possible that the individual connecting units 19 be fastened to various points of an element, and that these connecting units 19 converge like a spider web to a single fastening point of an adjacent element, so as to thereby couple or connect both elements with each other.

Figure 6A:
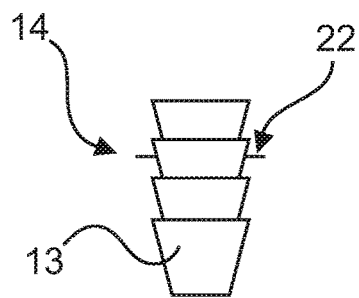
FIG. 6A shows a fastening of several hinged-together elements according to an exemplary embodiment of the invention.

FIG. 6A shows how the hinged-together elements 13 are fastened by a screwed connection 22. The hinged-together elements 13 may here at least partially overlap, and at least partially envelop a body part 20 of a person 11. The flexible shell 14 formed by the plurality of hinged-together elements 13 may be pictured as a kind of scale armor for the respective body part 20. The individual truncated cone elements 13 may overlap each other in such a way that roughly half of a truncated cone element 13 projects into an adjacent truncated cone element 13. The individual elements 13 may also be coupled or connected with each other by plug or compression connectors. It is also possible to lock and/or align the individual elements 13 relative to each other with a hydraulic system. Fluid-filled chambers as well as valves may be provided for this purpose, which provide the hydraulic system with a fluid and regulate the hydraulic system. For example, the individual elements may then be aligned or locked relative to each other by individually filling or evacuating the chamber preferably provided in the connecting area between two elements 13.

Figure 6B:
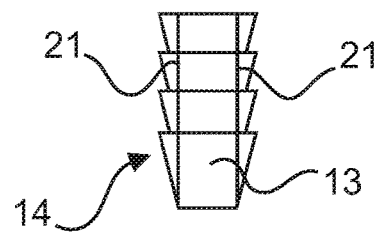
FIG. 6B shows a fastening of several hinged-together elements according to another exemplary embodiment of the invention.

FIG. 6B shows how several hinged-together elements 13 are secured by ropes 21. These ropes 21 may comprise an elastic material, making it possible to achieve a pre-tensioning, which allows a specific alignment of individual elements 13 relative to each other. In the configuration depicted on FIG. 6B, four hinged-together elements 13 are coupled or fastened to each other by the ropes 21. These ropes 21 are connecting elements. As a consequence, other elements are also possible, such as rods and wires. The ropes, rods or wires may here each comprise a varying flexibility or different materials.

Figure 6C:
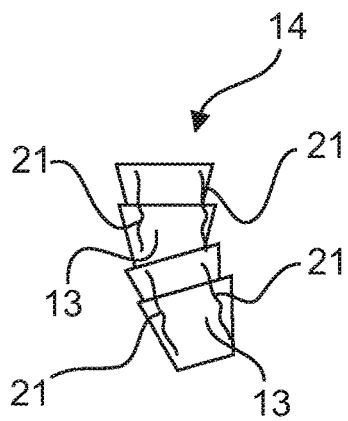
FIG. 6C shows a fastening of several hinged-together elements according to another exemplary embodiment of the invention.

FIG. 6C shows a configuration in which two hinged-together elements 13 are each coupled or fastened together by a respective two ropes 21. How many respective hinged-together elements 13 may be fastened to each other by screws 22 or ropes 21 may depend on the position in which the individual elements 13 are relative to the body part of the person 11. In particular, let it be noted that fewer screws 22 or ropes 21 are provided in the area of a joint of the person, so as to give the person good mobility in the joint area. For example, FIG. 6C thus depicts a section of the flexible shell 14, which is comprised of a plurality of hinged-together elements 13, wherein the section is located in the joint area of the person. By contrast, FIG. 6B shows a section of the flexible shell 14 in which no joint of the body part of the person 11 is located, thereby making it advantageous for there to be a reduced mobility of the individual elements 13.

Figure 6D:
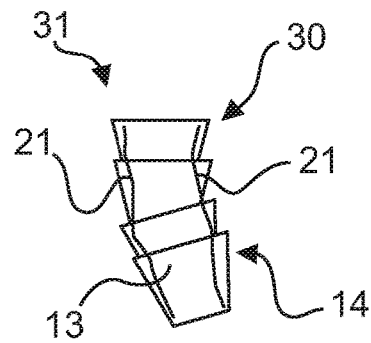
FIG. 6D shows a fastening of several hinged-together elements according to another exemplary embodiment of the invention.

FIG. 6D shows a pre-tensioning unit 30, which is formed by several hinged-together elements 13. For example, the individual hinged-together elements 13 are connected or fastened to each other by ropes 21 or elastic components, so that the flexible shell 14 comprised of a plurality of hinged-together elements 13 may be adjusted to the shape of the body part of the person 11. The rope-shaped or elastic components may comprise specific mechanical properties, so that the flexible shell 14 assumes a specific shape in an unloaded state, as depicted on FIG. 6D. In particular, pre-tensioning elements relative to each other may be advantageous during assembly work at eye level, e.g., since the arms must be held in a specific position for a longer period of time in this case. In addition, the pre-tensioning unit 30 may be arranged in such a way as to prohibit specific movements of the body part of the person 11 or only enable them with a high exertion of force.

Figure 7:
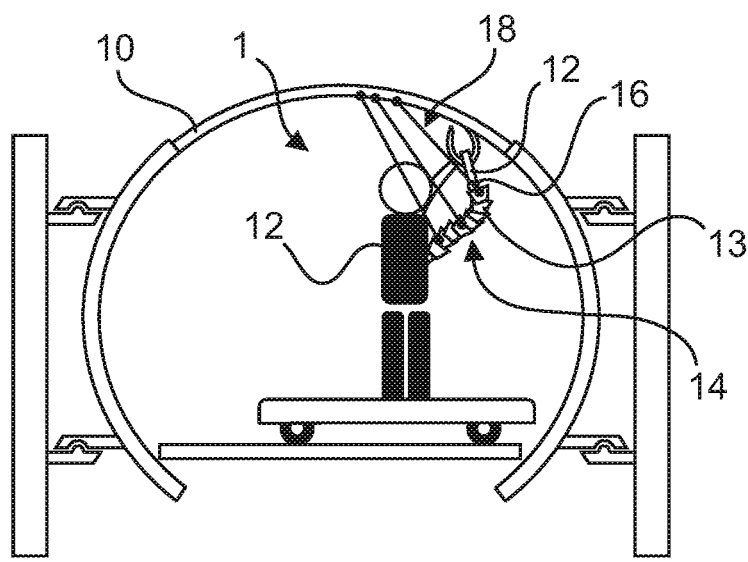
FIG. 7 shows an assembly support device, which is secured to an aircraft fuselage or spacecraft fuselage, according to an exemplary embodiment of the invention.

FIG. 7 shows an assembly support device 1 for stabilizing a body part of a person 11 during the assembly of an aircraft fuselage 10. The assembly support device 1 comprises a plurality of hinged-together elements 13, which together form a flexible shell 14, and thereby stabilize the body part of the person 11. A first end 17a of the flexible shell 14 is provided with a fastening element 16 for securing a tool 12 to the flexible shell 14. For example, the person 11 may use this tool 12 to mount a component inside of the airplane fuselage 10. Also provided is a fastening unit 18, which secures the flexible shell 14 to the aircraft fuselage 10. For example, three ropes or rods are here provided, with which the flexible shell 14 is secured to the aircraft fuselage 10.

Figure 8A:
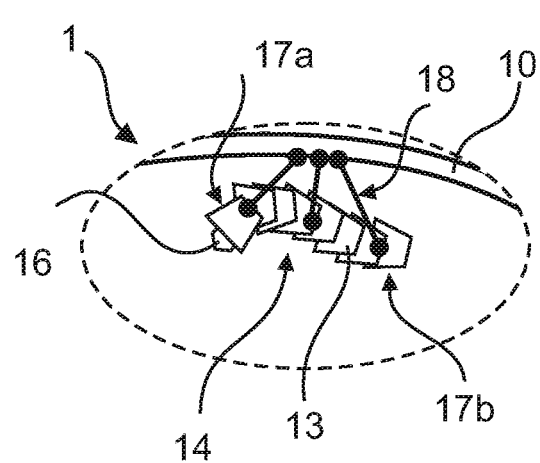
FIG. 8A shows an assembly support device, which is secured to an aircraft fuselage or spacecraft fuselage, according to another exemplary embodiment of the invention.

FIG. 8A presents a detailed view of an assembly support device 1 fastened to the aircraft fuselage 10, wherein the flexible shell 14 of the assembly support device 1 is not stacked on a body part of a person 11. This means that a person 11 may stack the flexible shell 14 onto the used body part if needed, so that the assembly support device 1 may be used for assembling a component inside the vehicle fuselage 10. The flexible shell 14, which is formed by a plurality of movably interconnected elements 13, is secured to the aircraft fuselage 10 by the fastening unit 18. The fastening element 16 for connecting a tool 12 to the flexible shell 14 is located at the first end 17a of the flexible shell 14. A connecting piece (not shown here) may further be provided in the area of the second end 17b of the flexible shell 14, and used to fasten the flexible shell 14 to a support structure 50, which envelops the upper body of the person 11 or torso of the person 11. For example, the flexible shell 14 may be slipped onto the body part of the person 11 by pushing the body part of the person 11 into the second end 17b of the flexible shell 14. For example, the person 11 in the area of the second end 17b of the flexible shell 14 reaches into the latter, so that the hand is located in the area of the first end 17a with the flexible shell 14 stacked on.

Figure 8B:
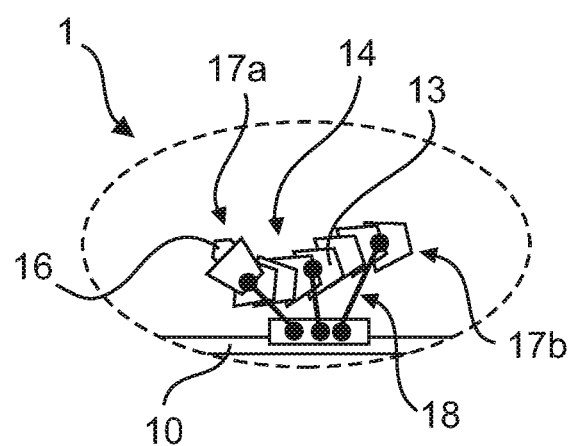
FIG. 8B shows an assembly support device, which is secured to a spacecraft fuselage, according to an exemplary embodiment of the invention.

FIG. 8B presents a detailed view of a support device 1 fastened to a spacecraft fuselage 10. The support device 1 may be used as a means for slowing bone and muscle loss or training a person 11. The fastening unit 18 may here be used to generate an active movement of the support device 1, for example by a controller, which supports the person while training a body part enveloped by the support device. Forces may here be specifically introduced into various areas of the body. As a consequence, the support device 1 may also be used in the field of sports, in particular for training the musculature of the person 11 during use in space travel.

Figure 9:
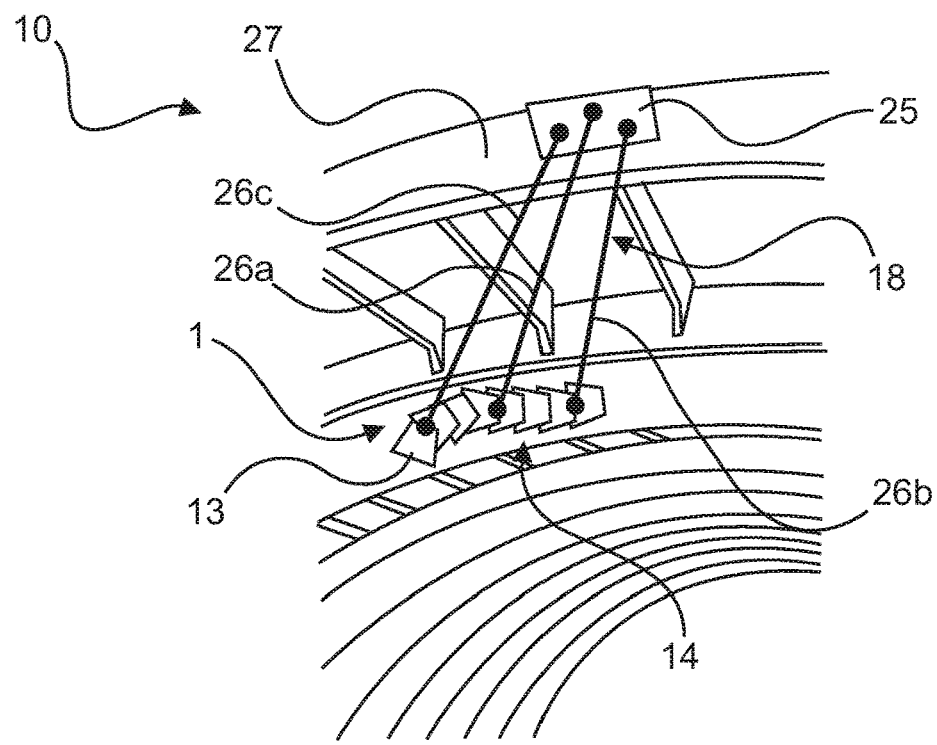
FIG. 9 shows an assembly support device secured to a frame of an aircraft according to an exemplary embodiment of the invention.

FIG. 9 shows an aircraft fuselage 10, to which an assembly support device 1 has been secured by a fastening device 18. For example, the fastening device 18 comprises an adapter 25 as well as a first rope 26a, a second rope 26b and a third rope 26c. However, rod-shaped components may also be provided to fasten the flexible shell 14 to the aircraft fuselage 10 via the adapter 25. Frames 27 may here be used inside the aircraft fuselage 10, to which the fastening unit 18 secures the flexible shell 14 to the airplane fuselage via the adapter 25. In other words, devices already integrated into the aircraft fuselage 10 may be used to fasten the assembly support device 1 in the aircraft fuselage 10.

Figure 10:
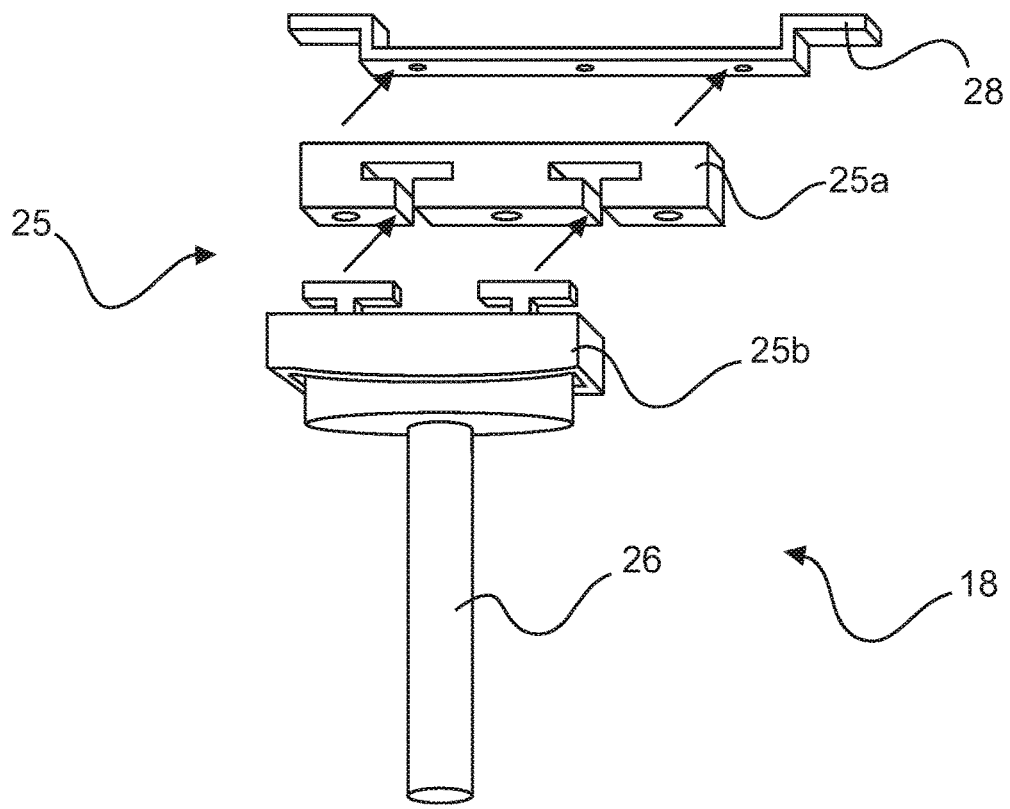
FIG. 10 shows a part of a fastening unit according to an exemplary embodiment of the invention.

FIG. 10 shows how a rope-shaped or rod-shaped component 26 of the fastening unit 18 is secured to a device 28 of the aircraft fuselage 10 with an adapter 25. The adapter 25 here comprises a first adapter part 25a, which is secured to the device 28 of the aircraft fuselage 10 or integrated therein, as well as a second adapter part 25b, which may be fastened to the vehicle fuselage 10 in the first adapter part by way of a translational movement, for example through insertion. For example, the rope-shaped or rod-shaped component 26 is fastened to the second adapter part 25b, and in turn has secured to it the flexible shell 14 of the assembly support device 1 that is not depicted on FIG. 10. The first adapter part 25a may be fastened to the device 28 of the aircraft fuselage 10 by a screwed connection, for example. For example, the device 28 of the aircraft fuselage 10 may be fastened to the aircraft fuselage 10 by a riveted connection, or integrated into the aircraft fuselage 10.

Figure 11:
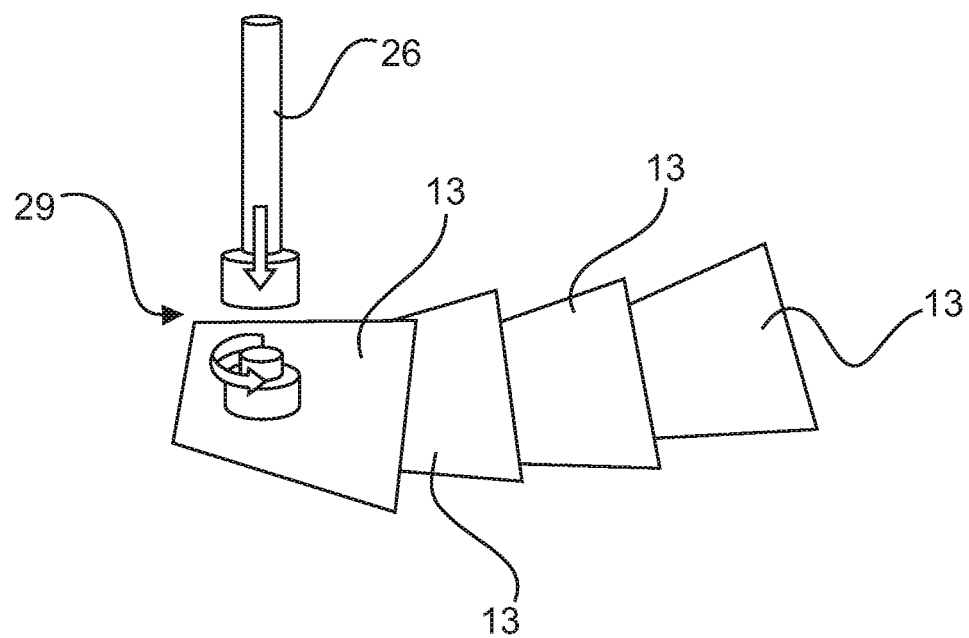
FIG. 11 shows a part of a fastening unit along with several hinged-together elements according to an exemplary embodiment of the invention.

FIG. 11 shows four hinged-together elements 13, which collectively form a section of a movable shell 14, as well as the rope-shaped or rod-shaped component 26, with which the section of flexible shell 14 is fastened to the aircraft fuselage 10 that is not depicted on FIG. 11. For example, the section of flexible shell 14 and rope-shaped or rod-shaped component 26 may be fastened by a quick-release fastener or screw cap 29. However, magnetic connecting pieces or connecting pieces for fastening the section of flexible shell 14 with the rope-shaped or rod-shaped component 26 may also be provided.

Figure 12:
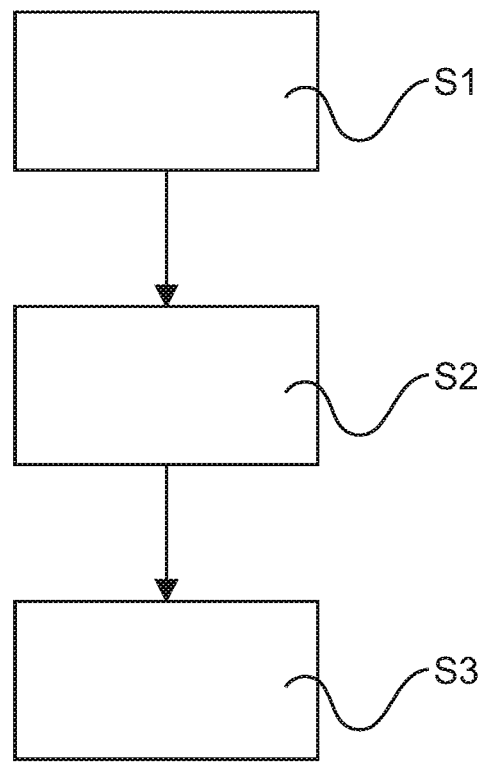
FIG. 12 shows a flowchart of a method for stabilizing a body part of a person.

FIG. 12 shows a flowchart for a method for stabilizing a body part of a person 11 during the assembly of a vehicle. In one step S1 of the method, a body part of a person 11 is enveloped by a plurality of hinged-together elements 13. In another step S2 of the method, a flexible shell 14 of the body part of the person 11 is formed by the plurality of hinged-together elements 13. In another step S3 of the method, a portion of the load acting on the body part of the person 11 is further transferred by the flexible shell 14 to stabilize the body part of the person 11.

In addition, let it be noted that "comprising" does not preclude any other elements or steps, and that "a" or "an" do not rule out a plurality. Let it further be noted that features or steps that were described with reference to one of the above exemplary embodiments can also be used in combination with other features or steps of other exemplary embodiments described above. Reference numbers in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support device for stabilizing a body part of a person, the support device comprising:
   a plurality of hinged-together elements configured to at
      least partially envelop the body part of the person, so that the plurality of hinged-together elements collectively forms a flexible shell of the body part of the person;
a fastening device for securing the flexible shell to a vehicle component; and
an adapter secured to a device of the vehicle component and configured to receive a component of the fastening device,
wherein the flexible shell is configured to transfer a portion of a load acting on the body part of the person to stabilize the body part of the person,
wherein at least two of the plurality of hinged-together elements are configured to be latched together in a specific alignment, and
wherein the adapter comprises:
a first adapter part secured to the device of the vehicle component; and
a second adapter part secured to the component of the fastening device.

2. The support device according to claim 1,
wherein the flexible shell is configured to transfer a load caused by a tool.

3. The support device according to claim 1,
wherein at least two of the plurality of hinged-together elements mutually overlap or mesh into each other.

4. The support device according to claim 1,
wherein the plurality of hinged-together elements is joined together by mechanical or magnetic connecting units.

5. The support device according to claim 1, further comprising:
a control unit configured to align the plurality of hinged-together elements or latch at least two of the hinged-together elements in a specific alignment relative to each other.

6. The support device according to claim 1, wherein the fastening device comprises a plurality of ropes or rods securing the flexible shell to the vehicle component.

7. The support device according to claim 1, wherein the second adapter part is configured to be fastened to the first adapter part via a translational movement.

8. The support device according to claim 1, further comprising
a fastening element for detachably securing a tool to the support device in the area of a first end of the flexible shell.

9. The support device according to claim 8,
wherein the fastening element for detachably securing the tool to the support device comprises a ball joint configured to align the tool relative to the plurality of hinged-together elements.

10. The support device according to claim 1, wherein the body part of the person comprises an arm of the person, and
wherein the plurality of hinged-together elements is configured to at least partially envelop the arm of a person, so that the plurality of hinged-together elements together forms the flexible shell for the arm of the person.

11. The support device according to claim 10, further comprising:
a support structure attached to the flexible shell of the arm, the support structure configured to at least partially envelop a torso of the person.

12. A vehicle, to which is fastened a support device comprising:
a plurality of hinged-together elements configured to at least partially envelop a body part of a person, so that the plurality of hinged-together elements collectively forms a flexible shell of the body part of the person;
a fastening device for securing the flexible shell to a vehicle component; and
an adapter secured to a device of the vehicle component and configured to receive a component of the fastening device,
wherein the flexible shell is configured to transfer a portion of the load acting on the body part of the person to stabilize the body part of the person,
wherein at least two of the plurality of hinged-together elements are configured to be latched together in a specific alignment, and
wherein the adapter comprises:
a first adapter part secured to the device of the vehicle component; and
a second adapter part secured to the component of the fastening device.

13. The vehicle according to claim 12, wherein the fastening device comprises a plurality of ropes or rods securing the flexible shell to the vehicle component.

* * * * *